(12) United States Patent
Lin et al.

(10) Patent No.: US 12,429,089 B2
(45) Date of Patent: Sep. 30, 2025

(54) SLIDING RAIL

(71) Applicant: FOSITEK CORPORATION, New Taipei (TW)

(72) Inventors: Chun-Han Lin, New Taipei (TW); Che-Wei Chang, New Taipei (TW); Hao-Ping Wang, New Taipei (TW); Jia-Wei Pan, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 33 days.

(21) Appl. No.: 18/660,810

(22) Filed: May 10, 2024

(65) Prior Publication Data

US 2025/0215926 A1    Jul. 3, 2025

(30) Foreign Application Priority Data

Dec. 27, 2023   (TW) ................................ 112151000

(51) Int. Cl.
*F16C 29/02*    (2006.01)
*A47B 88/423*    (2017.01)
(Continued)

(52) U.S. Cl.
CPC ............ *F16C 29/10* (2013.01); *A47B 88/423* (2017.01); *A47B 88/427* (2017.01); *A47B 88/473* (2017.01); *A47B 88/483* (2017.01); *A47B 88/49* (2017.01); *F16C 29/02* (2013.01); *A47B 2088/4235* (2017.01);
(Continued)

(58) Field of Classification Search
CPC ...... F16C 29/02; F16C 29/10; F16C 2314/70; F16C 2314/72; A47B 88/423; A47B 88/427; A47B 88/473; A47B 88/477; A47B 88/483; A47B 88/49; A47B 2088/4235; A47B 2088/4274; A47B 2088/4276; A47B 2088/4278; A47B 2210/0016; A47B 2210/0018; A47B 2210/0081

See application file for complete search history.

(56) References Cited

U.S. PATENT DOCUMENTS 6,367,899 B1 *   4/2002   Hwang .................. A47B 88/57
                                                  312/334.47
6,945,619 B1 *   9/2005   Chen .................... A47B 88/487
                                                  312/334.47
(Continued)

*Primary Examiner* — Phillip A Johnson
(74) *Attorney, Agent, or Firm* — Birch, Stewart, Kolasch & Birch, LLP

(57) ABSTRACT

A sliding rail is adapted to be engaged with an engaging member, and includes a track and a limiting mechanism. The track includes a base wall, two side walls, and two pivoting slots. The limiting mechanism includes first and second operating members, a limiting member, and first and second connecting members. The first operating member is operable for driving the limiting member from a locked position, where the engaging member is contained in a limiting space between the limiting member and one of the side walls, to a first unlocked position, where the limiting member is rotated about the second connecting member to open the limiting space. The second operating member is operable for driving the limiting member from the locked position to a second unlocked position, where the limiting member is rotated about the first connecting member to open the limiting space.

7 Claims, 6 Drawing Sheets

(51) Int. Cl.
    *A47B 88/427*     (2017.01)
    *A47B 88/473*     (2017.01)
    *A47B 88/483*     (2017.01)
    *A47B 88/49*      (2017.01)
    *F16C 29/10*      (2006.01)

(52) U.S. Cl.
    CPC ............... *A47B 2210/0016* (2013.01); *A47B 2210/0018* (2013.01); *A47B 2210/0081* (2013.01); *F16C 2314/70* (2013.01)

(56) References Cited

U.S. PATENT DOCUMENTS

| | | | |
|---|---|---|---|
| 6,997,529 B1* | 2/2006 | Chen | A47B 88/493 |
| | | | 312/334.47 |
| 8,585,164 B2* | 11/2013 | Chen | A47B 88/49 |
| | | | 312/334.46 |
| 2010/0019638 A1* | 1/2010 | Duan | G06F 1/183 |
| | | | 312/334.44 |
| 2018/0270982 A1* | 9/2018 | Chen | A47B 88/423 |

* cited by examiner

SLIDING RAIL

CROSS-REFERENCE TO RELATED APPLICATION

This application claims priority to Taiwanese Invention Patent application Ser. No. 11/215,1000, filed on Dec. 27, 2023, the entire disclosure of which is incorporated by reference herein.

FIELD

The disclosure relates to a sliding rail, and more particularly to a sliding rail with locking functions.

BACKGROUND

A conventional sliding rail is adapted to be engaged with an engaging member of another sliding rail. The conventional sliding rail has two locking operating members, two unlocking operating members, and two limiting members. The locking operating members are operable for driving the limiting members to engage with the engaging member, so that the conventional sliding rail may be locked with the another sliding rail. The unlocking operating members are operable for disengaging the engaging member from the limiting members. The conventional sliding rail has many components, and therefore it is hard to be assembled and has heavy weight; furthermore, the structure of the conventional sliding rail takes up much space, and may not have sufficient structural strength. Hence, there is room for improvement.

SUMMARY

Therefore, an object of the disclosure is to provide a sliding rail that can alleviate at least one of the drawbacks of the prior art.

According to the disclosure, the sliding rail is adapted to be engaged with an engaging member. The sliding rail includes a track and a limiting mechanism. The track has a base wall, two side walls, and two pivoting slots. The two side walls extend respectively and transversely from opposite sides of the base wall. The base wall has first and second ends that are opposite to each other and that are disposed between the side walls. The two pivoting slots are formed in the base wall and are spaced apart from each other. The limiting mechanism includes first and second operating members, a limiting member, and first and second connecting members. The first and second operating members are movably disposed on the base wall. The limiting member is pivotably connected to the base wall and the first and second operating members. The first connecting member extends through the limiting member, the first operating member and the base wall. The second connecting member extends through the limiting member, the second operating member and the base wall. The first operating member is formed with a first linking slot. The first connecting member extends movably through the first linking slot. The first linking slot has a first tip, and a first right end disposed below the first tip. A distance between the first right end and the second end of the base wall is shorter than a distance between the first tip and the second end of the base wall. The second operating member is formed with a second linking slot. The second connecting member extends movably through the second linking slot. The second linking slot has a second tip, and a second right end disposed below the second tip. A distance between the second right end and the second end of the base wall is shorter than a distance between the second tip and the second end of the base wall. The limiting member has a connecting portion and two pivoting portions connected respectively to opposite ends of the connecting portion. The first and second connecting members extend respectively through the pivoting portions. The first operating member is operable for driving the limiting member to move between a locked position and a first unlocked position, and the second operating member is operable for driving the limiting member to move between the locked position and a second unlocked position. When the limiting member is in the locked position, the connecting portion, the pivoting portions, and one of the side walls cooperatively define a limiting space that is adapted to contain the engaging member. When the limiting member is in the locked position, the first operating member is movable towards the first end of the base wall to rotate the limiting member about the second connecting member to the first unlocked position by virtue of engagement between the first connecting member and the first linking slot, thereby moving the first connecting member to the first right end of the first linking slot, and opening the limiting space to allow removal of the engaging member from the limiting space When the limiting member is in the locked position, the second operating member is movable towards the first end of the base wall to rotate the limiting member about the first connecting member to the second unlocked position by virtue of engagement between the second connecting member and the second linking slot, thereby moving the second connecting member to the second right end of the second linking slot, and opening the limiting space to allow removal of the engaging member from the limiting space.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
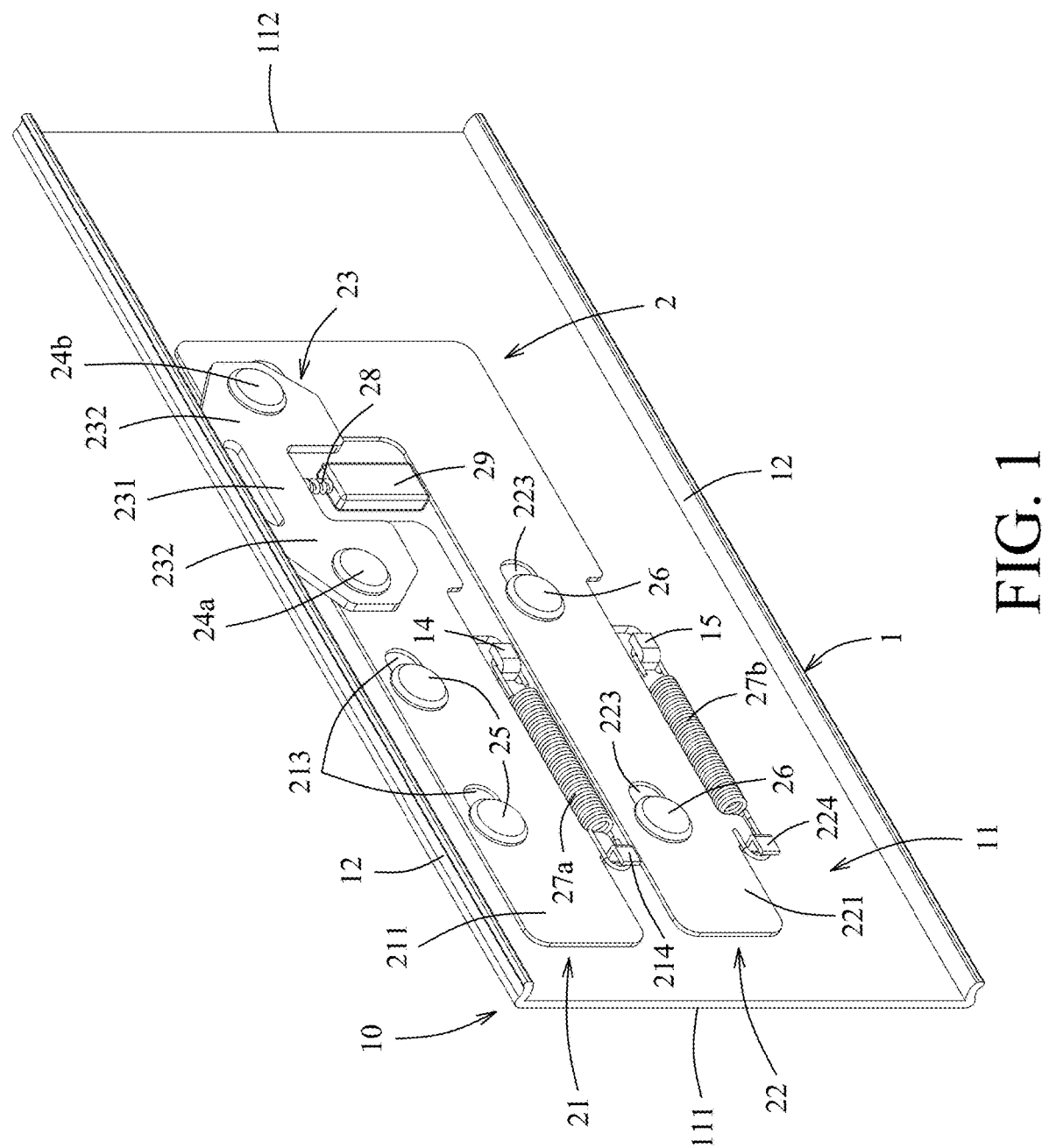
FIG. 1 is a perspective view illustrating an embodiment of a sliding rail according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
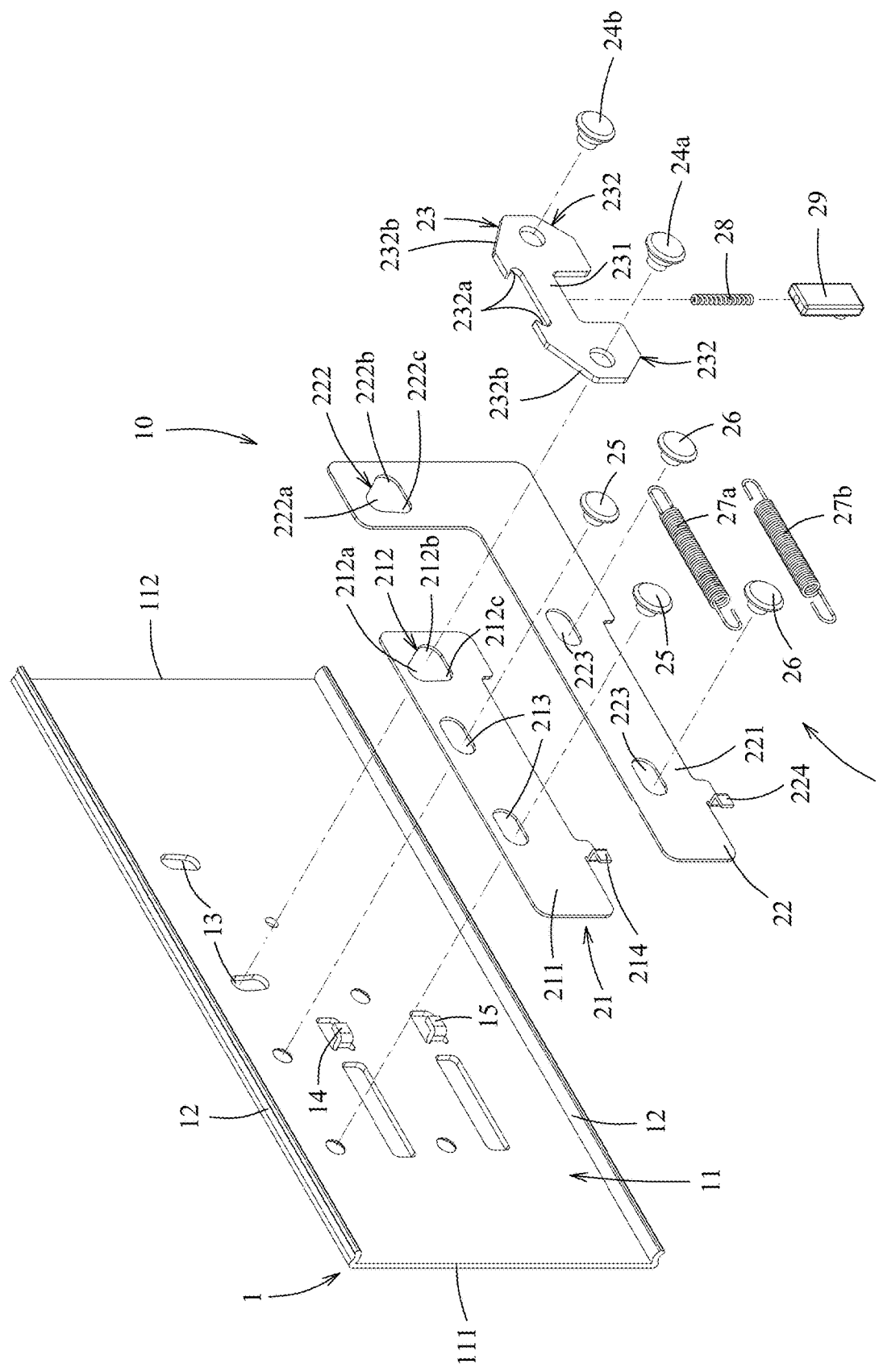
FIG. 2 is an exploded perspective view of the embodiment.
Figure 3:
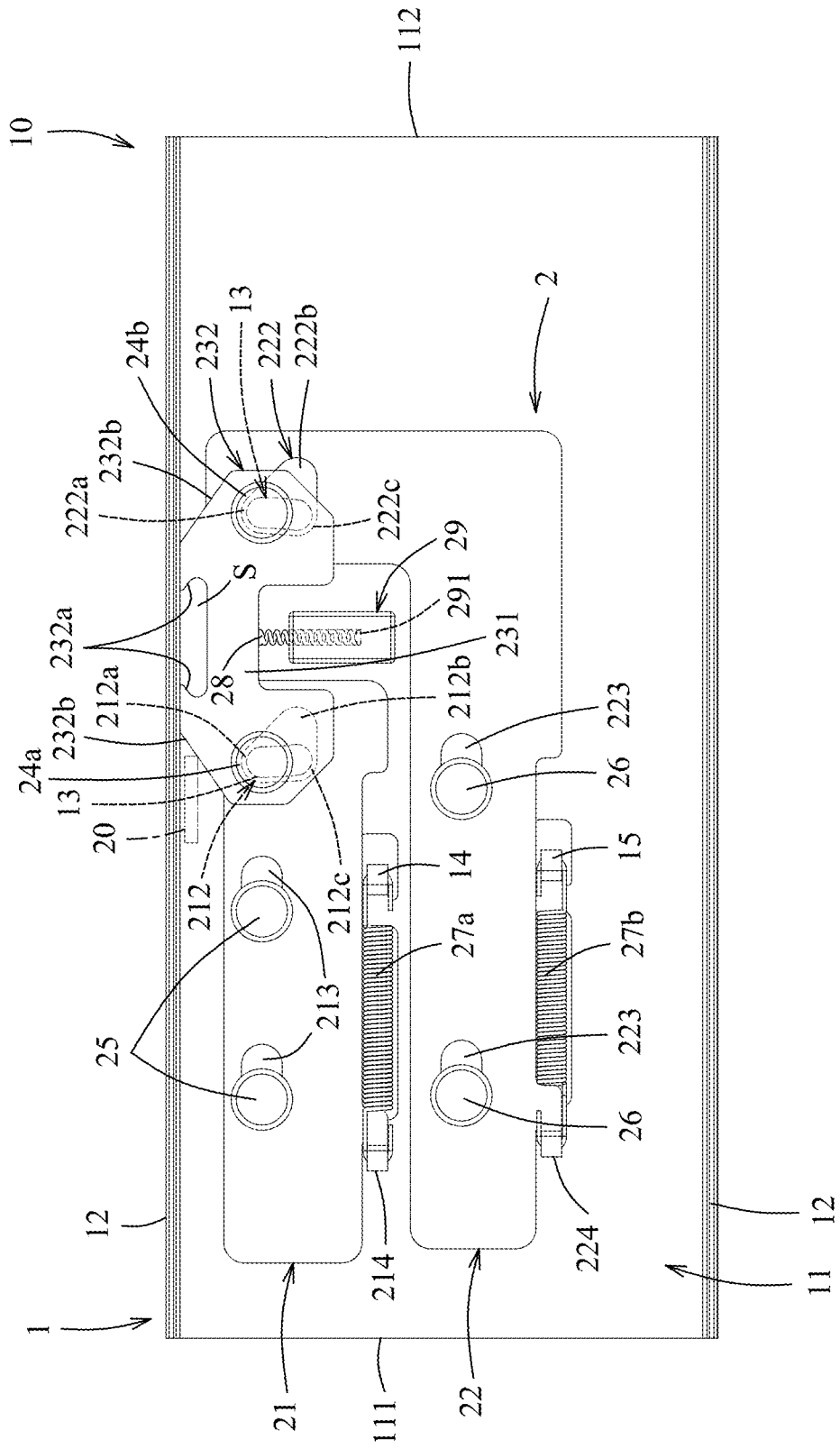
FIG. 3 is a side view of the embodiment, illustrating a limiting member in a locked position, and an engaging member abutting against a pivoting portion of the limiting member.

Referring to FIGS. 1 to 3, an embodiment of a sliding rail 10 according to the disclosure is adapted to be engaged with an engaging member 20 of another sliding rail (not shown). The sliding rail 10 includes a track 1 and a limiting mechanism 2.

The track 1 has a base wall 11, two side walls 12 extending respectively and transversely from opposite sides of the base wall 11, two pivoting slots 13 formed in the base wall 11 and spaced apart from each other, and first and second hooks 14, 15 formed on the base wall 11. The base wall 11 has first and second ends 111, 112 that are opposite to each other in a lengthwise direction and that are disposed between the side walls 12. Each of the pivoting slots 13 is substantially elongated in a transverse direction perpendicular to the lengthwise direction. The first hook 14 and the second hook 15 are disposed between the side walls 12, and are arranged in the transverse direction in a manner where the first hook 14 is proximate to one of the side walls 12 and the second hook 15 is proximate to the other one of the side walls 12.

The limiting mechanism 2 includes first and second operating members 21, 22 movably disposed on the base wall 11, a limiting member 23 pivotably connected to the base wall 11 and the first and second operating members 21, 22, a first connecting member 24a extending through the limiting member 23, the first operating member 21 and one of the pivoting slots 13 of the base wall 11, a second connecting member 24b extending through the limiting member 23, the second operating member 22 and the other one of the pivoting slots 13 of the base wall 11, two first guiding members 25 spaced apart from each other and extending through the first operating member 21 and the base wall 11, two second guiding members 26 spaced apart from each other and extending through the second operating member 22 and the base wall 11, first and second operating resilient members 27a, 27b, a limiting resilient member 28, and a retainer 29 fixed to the base wall 11. The first operating member 21 has a first operating body 211 and a first hook portion 214, and is formed with a first linking slot 212 and two first guiding slots 213. Specifically, the first linking slot 212 and the first guiding slots 213 are formed in the first operating body 211. The first linking slot 212 is formed in an end of the first operating body 211 that is proximate to the second end 112 of the base wall 11. The first connecting member 24a extends movably through the first linking slot 212. Each of the first guiding slots 213 is elongated in the lengthwise direction, and the first guiding slots 213 are spaced apart from each other in the lengthwise direction. The first hook portion 214 extends from the first operating body 211, and is disposed between the first operating body 211 and the second operating member 22. The first operating body 211 is an elongated plate or sheet. The first linking slot 212 is triangularly shaped, and has a first tip 212a, a first right end 212b disposed below the first tip 212a, and a first left end 212c disposed under the first tip 212a. A distance between the first right end 212b and the second end 112 of the base wall 11 is shorter than a distance between the first tip 212a and the second end 112 of the base wall 11, and the distance between the first right end 212b and the second end 112 of the base wall 11 is shorter than a distance between the first left end 212c and the second end 112 of the base wall 11. The second operating member 22 is formed with a second linking slot 222 and two second guiding slots 223, and has a second operating body 221 and a second hook portion 224. Specifically, the second linking slot 222 and the second guiding slots 223 are formed in the second operating body 221. The second linking slot 222 is formed in an end of the second operating body 221 that is proximate to the second end 112 of the base wall 11. The second connecting member 24b extends movably through the second linking slot 222. Each of the second guiding slots 223 is elongated in the lengthwise direction, and the second guiding slots 223 are spaced apart from each other in the lengthwise direction. The second hook portion 224 extends from the second operating body 221, and is disposed below the second operating body 221. The second linking slot 222 is triangularly shaped, and has a second tip 222a, a second right end 222b disposed below the second tip 222a, and a second left end 222c disposed under the second tip 222a. A distance between the second right end 222b and the second end 112 of the base wall 11 is shorter than a distance between the second tip 222a and the second end 112 of the base wall 11, and the distance between the second right end 222b and the second end 112 of the base wall 11 is shorter than a distance between the second left end 222c and the second end 112 of the base wall 11. The first guiding members 25 respectively extend through the first guiding slots 213 and are fixedly connected to the base wall 11, so that the first operating member 21 may move along a first axis extending in the lengthwise direction. The second guiding members 26 respectively extend through the second guiding slots 223 and are fixedly connected to the base wall 11, so that the second operating member 22 may move along a second axis extending in the lengthwise direction. The first operating resilient member 27a has two opposite ends respectively connected to the first hook 14 and the first hook portion 214 of the first operating member 21, and the second operating resilient member 27b has two opposite ends respectively connected to the second hook 15 and the second hook portion 224 of the second operating member 22. In other embodiments, the first and second hooks 14, 15 may be omitted, and the two opposite ends of the first operating resilient member 27a may be respectively and directly connected to the base wall 11 and the first hook portion 214 of the first operating member 21, and the two opposite ends of the second operating resilient member 27b may be respectively and directly connected to the base wall 11 and the second hook portion 224 of the second operating member 22.

The limiting member 23 has a connecting portion 231 and two pivoting portions 232 connected respectively to opposite ends of the connecting portion 231. The first and second connecting members 24a, 24b extend respectively through the pivoting portions 232. Each of the pivoting portions 232 has an upper part extending towards the one of the base walls 12. The upper parts of the pivoting portions 232 are inclined towards each other. The upper part of each of the pivoting portions 232 has an inner inclined surface 232a that faces the upper part of the other one of the pivoting portions 232 and that is connected to the connecting portion 231 of the limiting member 23, and an outer inclined surface 232b that is opposite to the inner inclined surface 232a. The limiting resilient member 28 has two opposite ends, where one of the ends is connected to the base wall 11, and the other one of the ends abuts against the limiting member 23. The retainer 29 has a retaining slot 291 accommodating the other one of the ends of the limiting resilient member 28. It should be noted that, in other embodiments, the retainer 29 may be omitted, and the one of the ends of the limiting resilient member 28 may be directly connected to the base wall 11, and the configurations thereof are not limited to configurations of this embodiment. Furthermore, the functions of the first hook 14 and the first hook portion 214 are to allow connection between the first operating resilient member 27a, the base wall 11, and the first operating member 21, and the configurations thereof are not limited to the configurations of this embodiment (i.e., the two opposite ends of the first resilient member 27a may be respectively connected to other components, if they could fulfill the functions of the first hook 14 and the first hook portion 214). Similarly, the functions of the second hook 15 and the second hook portion 224 are to allow connection between the second operating resilient member 27b, the base wall 11, and the second operating member 22, and the two opposite ends of the second resilient member 27b may be respectively connected to other components, if they could fulfill the functions of the second hook 15 and the second hook portion 224. An operating method of the sliding rail 10 is as follows.

Figure 4:
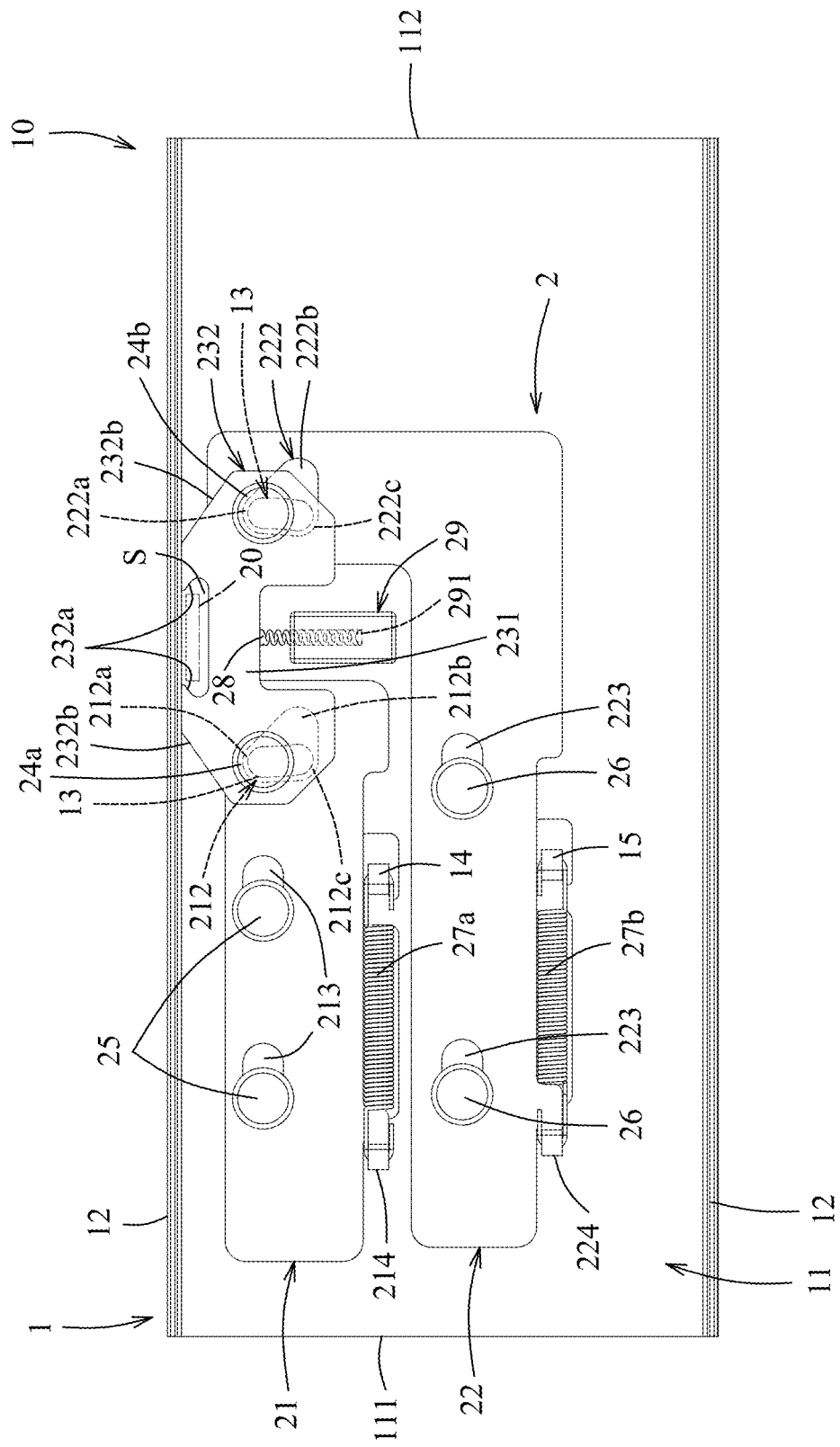
FIG. 4 is a side view of the embodiment, illustrating the limiting member in the locked position, and the engaging member in a limiting space.
Figure 5:
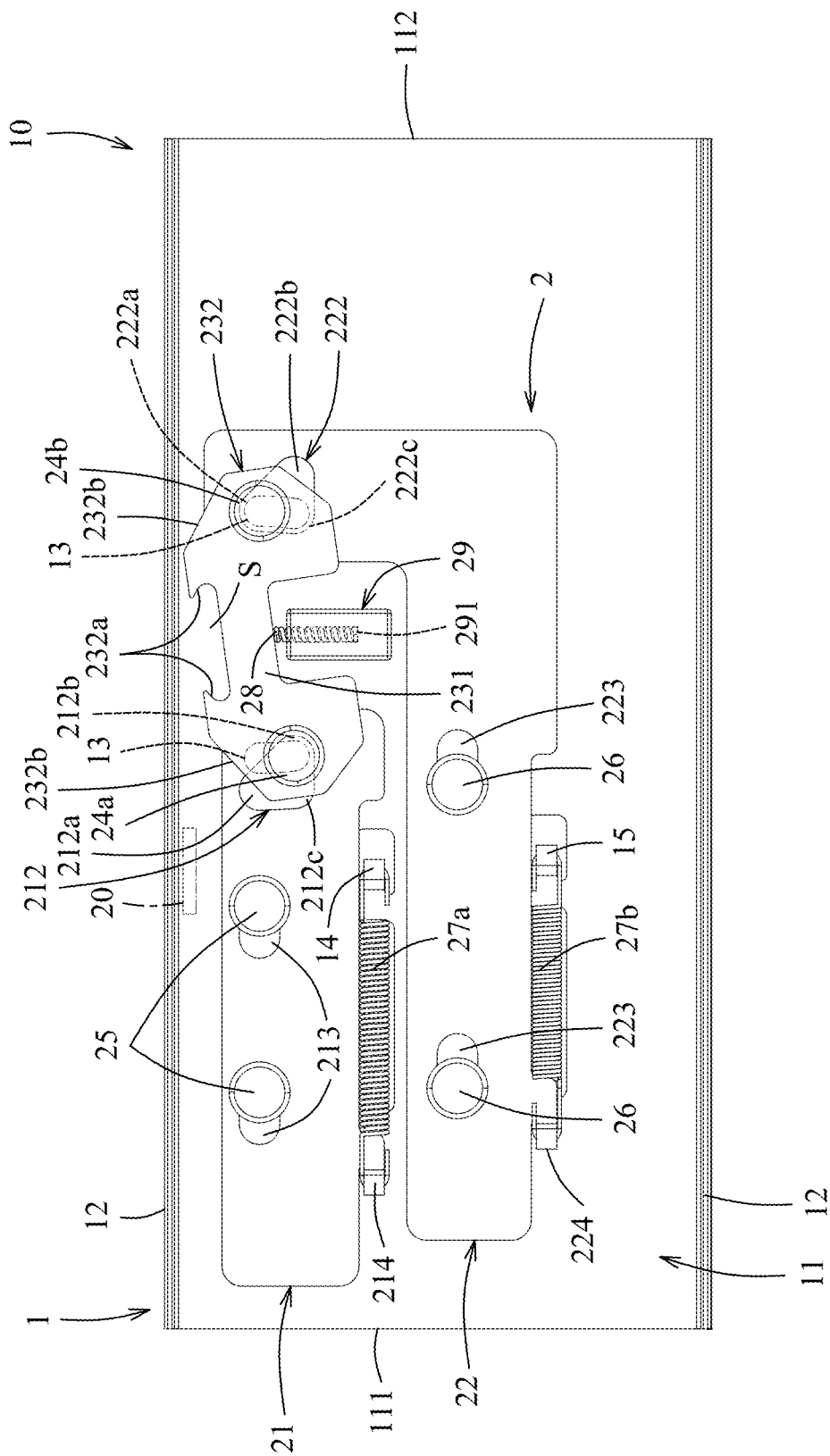
FIG. 5 is a side view of the embodiment, illustrating the limiting member in a first unlocked position, and the engaging member removed from the limiting space.
Figure 6:
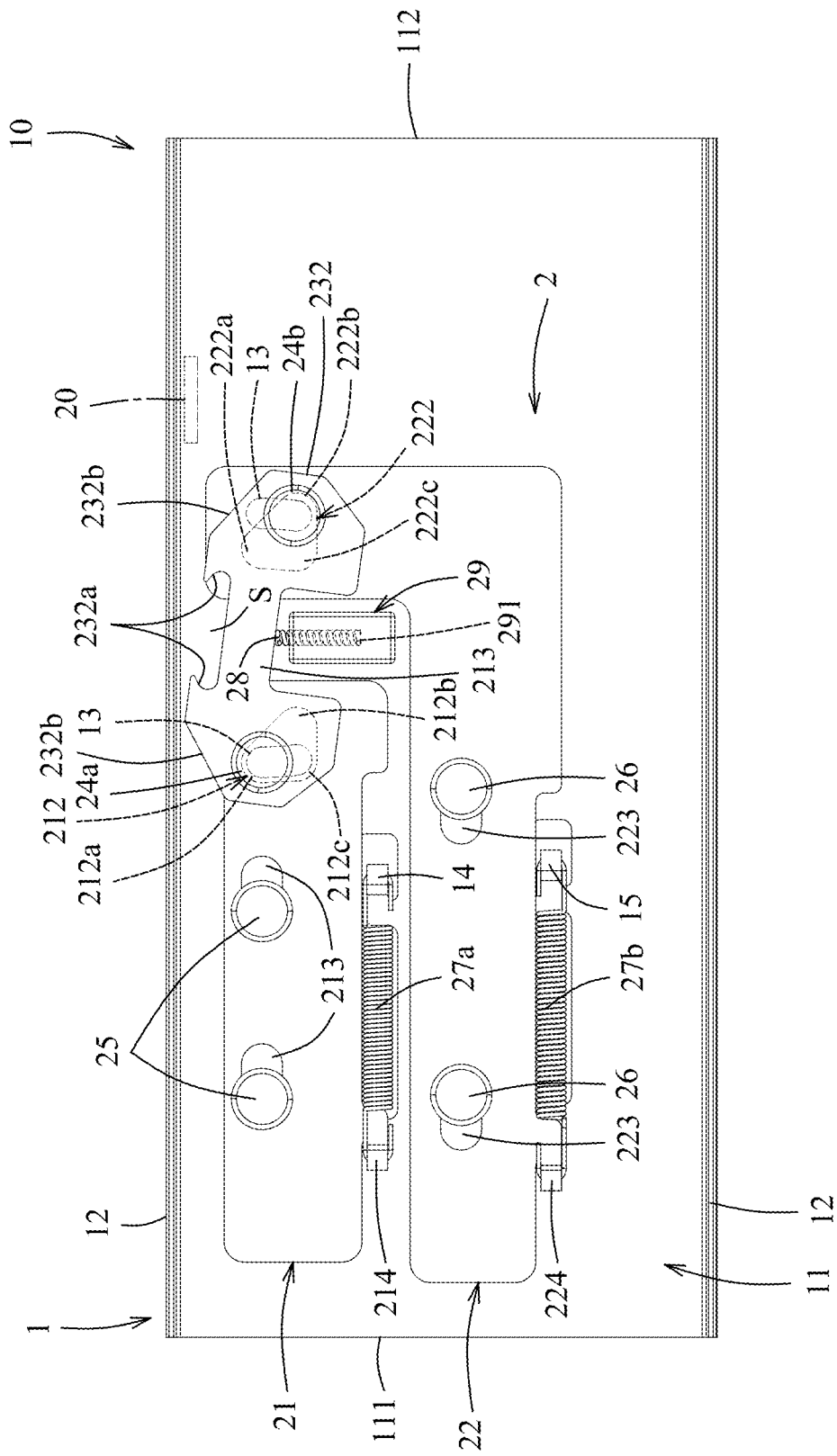
FIG. 6 is a side view of the embodiment, illustrating the limiting member in a second unlocked position, and the engaging member removed from the limiting space.

Referring to FIGS. 4 to 6, the first operating member 21 is operable for driving the limiting member 23 to move between a locked position (FIGS. 3 and 4) and a first unlocked position (FIG. 5), and the second operating member 22 is operable for driving the limiting member 23 to move between the locked position and a second unlocked position (FIG. 6). Specifically, when the limiting member 23 is in the locked position, the connecting portion 231, the pivoting portions 232, and the one of the side walls 12 cooperatively define a limiting space (S) that is adapted to contain the engaging member 20. Referring to FIGS. 3 and 4, when the limiting member 23 is in the locked position, the engaging member 20 may be moved in a direction from the first end 111 of the base wall 11 to the second end 112 of the base wall 11 to abut against the outer inclined surface 232b of one of the pivoting portions 232 to thereby downwardly rotate the limiting member 23 about the second connecting member 24b to move the first connecting member 24a from the first tip 212a of the first linking slot 212 to the first left end 212c of the first linking slot 212 without moving the first operating member 21, so that the engaging member 20 is allowed to enter the limiting space (S). Referring to FIGS. 4 and 5, when the limiting member 23 is in the locked position and when the engaging member 20 is in the limiting space (S), the first operating member 21 is movable towards the first end 111 of the base wall 11 to rotate the limiting member 23 about the second connecting member 24b to the first unlocked position by virtue of engagement between the first connecting member 24a and the first linking slot 212, thereby moving the first connecting member 24a to the first right end 212b of the first linking slot 212, and opening the limiting space (S) to allow removal of the engaging member 20 from the limiting space (S) (see FIG. 5). When the engaging member 20 is removed from the limiting space (S) and when the limiting member 23 is moved back to the locked position, the another sliding rail and the sliding rail 10 may be moved to substantially overlap with each other. Referring to FIGS. 4 and 6, when the limiting member 23 is in the locked position and when the engaging member 20 is in the limiting space (S), the second operating member 22 is movable towards the first end 111 of the base wall 11 to rotate the limiting member 23 about the first connecting member 24a to the second unlocked position by virtue of engagement between the second connecting member 24b and the second linking slot 222, thereby moving the second connecting member 24b to the second right end 222b of the second linking slot 222, and opening the limiting space (S) to allow removal of the engaging member 20 from the limiting space (S) (see FIG. 6). When the engaging member 20 is removed from the limiting space (S), the another sliding rail may be moved to be disengaged from the sliding rail 10. Afterward, the engaging member 20 may be moved to enter the limiting space (S) in a direction from the second end 112 of the base wall 11 to the first end 111 of the base wall 11 by abutting the engaging member 20 against the outer inclined surface 232b of the other one of the pivoting portions 232 and rotating downwardly the limiting member 23 about the first connecting member 24a to move the second connecting member 24b from the second tip 222a of the second linking slot 222 to the second left end 222c of the second linking slot 222 without moving the second operating member 22.

It should be noted that, the first and second operating resilient members 27a, 27b respectively bias the first and second operating members 21, 22 towards the second end 112 of the base wall 11, and the limiting resilient member 28 biases the limiting member 23 towards the locked position. When the limiting member 23 is in the first unlocked position, the first operating resilient member 27a is stretched between the first hook portion 214 of the first operating member 21 and the first hook 14 and accumulates a biasing force that biases the first operating member 21 towards the second end 112 of the base wall 11. Similarly, when the limiting member 23 is in the second unlocked position, the second operating resilient member 27b is stretched between the second hook portion 224 of the second operating member 22 and the second hook 15, and accumulates a biasing force that biases the second operating member 21 towards the second end 112 of the base wall 11. When the limiting member 23 is in the first or second unlocked position, the limiting resilient member 28 is compressed and stores a biasing force that biases the limiting member 23 towards the locked position.

In conclusion, the first operating member 21 is operable for driving the limiting member 23 to move between the locked position and the first unlocked position, and the second operating member 22 is operable for driving the limiting member 23 to move between the locked position and the second unlocked position. The first and second operating members 21, 22 allow the sliding rail 10 to be unlocked in different directions; hence, compared to the aforementioned conventional sliding rail, there are less components, assembly is easier, and structure of the sliding rail 10 takes up less space and has less weight, and by virtue of the simpler structure, the structural strength is stronger. Hence, an objective of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A sliding rail adapted to be engaged with an engaging member, said sliding rail comprising:
    a track that has
        a base wall,
        two side walls extending respectively and transversely from opposite sides of said base wall, said base wall having first and second ends that are opposite to each other and that are disposed between said side walls; and
        two pivoting slots formed in said base wall and spaced apart from each other; and
    a limiting mechanism that includes
        first and second operating members movably disposed on said base wall,
        a limiting member pivotably connected to said base wall and said first and second operating members,
        a first connecting member extending through said limiting member, said first operating member and said base wall, and
        a second connecting member extending through said limiting member, said second operating member and said base wall;
    wherein said first operating member is formed with a first linking slot, said first connecting member extending movably through said first linking slot, said first linking slot having
        a first tip, and
        a first right end disposed below said first tip, a distance between said first right end and said second end of said base wall being shorter than a distance between said first tip and said second end of said base wall;
    wherein said second operating member is formed with a second linking slot, said second connecting member extending movably through said second linking slot, said second linking slot having
        a second tip, and
        a second right end disposed below said second tip, a distance between said second right end and said second end of said base wall being shorter than a distance between said second tip and said second end of said base wall;
    wherein said limiting member has a connecting portion and two pivoting portions connected respectively to opposite ends of said connecting portion, said first and second connecting members extending respectively through said pivoting portions;
    wherein said first operating member is operable for driving said limiting member to move between a locked position and a first unlocked position, and said second operating member is operable for driving said limiting member to move between the locked position and a second unlocked position;
    wherein, when said limiting member is in the locked position, said connecting portion, said pivoting portions, and one of said side walls cooperatively define a limiting space that is adapted to contain the engaging member;
    wherein, when said limiting member is in the locked position, said first operating member is movable towards said first end of said base wall to rotate said limiting member about said second connecting member to the first unlocked position by virtue of engagement between said first connecting member and said first linking slot, thereby moving said first connecting member to said first right end of said first linking slot, and opening said limiting space to allow removal of the engaging member from said limiting space; and
    wherein, when said limiting member is in the locked position, said second operating member is movable towards said first end of said base wall to rotate said limiting member about said first connecting member to the second unlocked position by virtue of engagement between said second connecting member and said second linking slot, thereby moving said second connecting member to said second right end of said second linking slot, and opening said limiting space to allow removal of the engaging member from said limiting space.

2. The sliding rail as claimed in claim 1, wherein:
    said first linking slot is triangularly shaped, and further has a first left end disposed under said first tip; and
    the distance between said first right end and said second end of said base wall is shorter than a distance between said first left end and said second end of said base wall.

3. The sliding rail as claimed in claim 1, wherein:
    said second linking slot is triangularly shaped, and further has a second left end disposed under said second tip;
    the distance between said second right end and said second end of said base wall is shorter than a distance between said second left end and said second end of said base wall.

4. The sliding rail as claimed in claim 1, wherein each of said pivoting portions has an upper part extending towards said one of said side walls, said upper part of each of said pivoting portions being inclined towards each other, said upper part of each of said pivoting portions having an inner inclined surface that faces said upper part of the other one of said pivoting portions and that is connected to said connecting portion of said limiting member, and an outer inclined surface that is opposite to said inner inclined surface.

5. The sliding rail as claimed in claim 1, wherein:
    said limiting mechanism further includes first and second operating resilient members, said first operating member having a first operating body and a first hook portion that extends from said first operating body, said second operating member having a second operating body and a second hook portion that extends from said second operating body;
    said first operating resilient member has two opposite ends respectively connected to said base wall and said first hook portion of said first operating member; and
    said second operating resilient member has two opposite ends respectively connected to said base wall and said second hook portion of said second operating member.

6. The sliding rail as claimed in claim 1, wherein said limiting mechanism further includes a limiting resilient member having two opposite ends, one of said ends being connected to said base wall, the other one of said ends abutting against said limiting member.

7. The sliding rail as claimed in claim 6, wherein said limiting mechanism further includes a retainer that is fixed to said base wall, and that has a retaining slot accommodating said other one of said ends of said limiting resilient member.

* * * * *